April 17, 1973  J. HEIDENHAIN ET AL  3,728,117

OPTICAL DIFFRACTION GRID

Filed Dec. 18, 1968  3 Sheets-Sheet 1

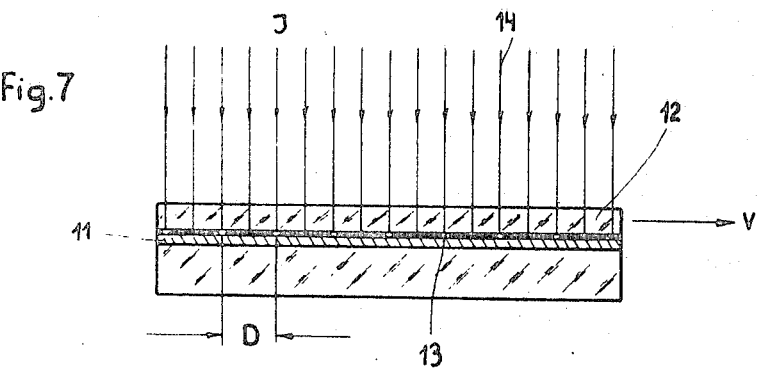
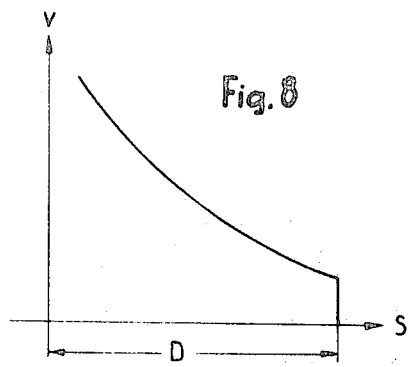
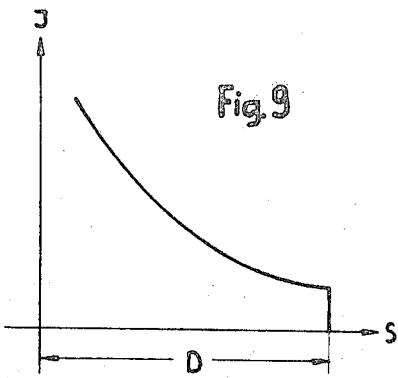
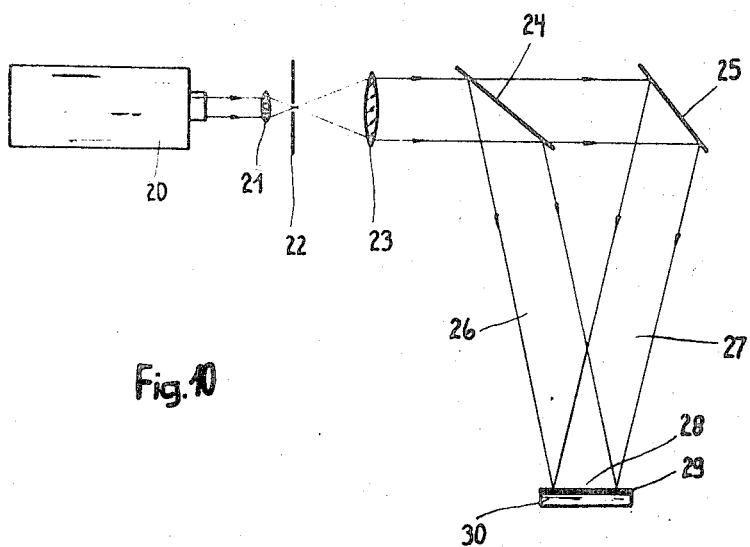

OPTICAL DIFFRACTION GRID

Johannes Heidenhain, Egerer, near Chieming, Horst Burkhardt, Stein an der Traun, and Heinz Kraus, Traunreut, Germany, assignors to Fa. Dr. Johannes Heidenhain, Traunreut, and Gunter Schmahl and Dietbert Rudolph, Gottingen-Greismar, Germany
Filed Dec. 18, 1968, Ser. No. 784,686
Claims priority, application Germany, Jan. 20, 1968, P 16 22 834.5
Int. Cl. G02b 5/18; G03c 11/00
U.S. Cl. 96—36          5 Claims

ABSTRACT OF THE DISCLOSURE

A method of producing optical diffraction grids having a predetermined asymmetric groove profile which comprises the steps of exposing a light sensitive layer to at least one system of fringes of light and positioning the light sensitive layer relative to the fringe system in such a manner that the locally resulting exposure is an asymmetric function with respect to a normal to the surface of the light sensitive layer, and subsequently developing the light sensitive layer.

---

The present invention relates to an optical diffraction grid with an asymmetric groove profile.

It is known to produce such grids by scratching with correspondingly formed diamonds. It is further known to produce optical diffraction grids such, that a layer, changeable by a light effect, is subjected to light by a stripe system, either by a prepared pattern, or by direct effect of a system of parallel equidistant interference stripes of coherent wave lines.

It is one object of the present invention, to provide an optical diffraction grid, which is a particularly advantageous development of the mentioned method, in which a light-sensitive layer is exposed to light.

It is another object of the present invention, to provide an optical diffraction grid, which amounts to a particularly advantageous formation of the diffraction grid produced in accordance with this method.

The present invention is characterized in the first place by means for controlling of the groove profile for production of predetermined profile forms.

The present invention permits the production of a groove profile of any desired shape by exposure to light by means set forth more clearly below.

In particular the following procedure is applied in the manufacture. For the light exposure interference systems are applied for the light exposure, which are created by the relative penetration of two parallel coherent light bundles. By variation of the penetration angle of both light bundles, it is possible to vary the stripe-spacing. It is thus possible to produce successively stripe systems, in which the number of the stripes per length unit has a ratio of 1:2:3 etc. In other words one can maintain the space frequencies of these stripe systems in full-number ratio. If successively a light-sensitive layer is exposed to these different stripe systems, the effect of the different exposures overlies each other in case of a layer having a moderate slope of the straight line portion of the characteristic curve of a photographic material has been chosen and even at points of maximum exposure, the layer has not reached yet the uppermost range of its gradation curve. By the exposure duration and/or the intensity, with which each individual stripe system contributes to the total exposure to each of these harmonic upper waves of the space frequency a predetermined wave can be coordinated, with which they enter into the total exposure. By slight lateral displacements of the light sensitive layer relative to the corresponding stripe system, one can bring about a predetermined relative phase position of the individual stripe systems, so that totally during the exposure a synthesis of any desired periodic function of base and upper waves is obtained. This takes place completely in analogy to the known representation of periodic functions in form of Fourier rows.

The light sensitive layer, for example, in known manner has become easier to be washed out at the exposed points than on the nonexposed points. During the development process a profile is created accordingly, and the rest of the layer remain after the development and, thereby, also the layer thickness is in at least approximately linear formation of the product of lighting intensity times time. The profile has a shape to be expected according to the Fourier analysis. By a subsequent metalizing, as by vacuum vaporizing of mirror metals, a reflection grid can be produced. If, however, a transmission grid is desired, it is merely required that the used light-sensitive layer, as well as its carrier are light-transparent and that the previously mentioned metalizing is omitted.

Departing from the above described type of exposure, the following method can also be applied. By means of the coherent parallel light bundles penetrating each other, stripe systems are produced again successively, the space frequencies of which are arranged at the ratio of 1:2:3 etc. Each of these stripe systems is affected upon a particular light-sensitive layer. By this arrangement patterns for the subsequent exposures of the layer capable of being profiled by a light effect can be created, on which, as described above, the final profile should be made by overlying. One can apply the greatest possible care during the production of these repeatedly usable individual patterns, in order to maintain exactly at full numbers the ratio of the space frequencies, so that in the following overlying by exposure no moire effect occurs. These individual patterns can be equipped with mechanical abutments or optically observable pass marks such, that during use of series production the adjustment operation relative to the relative phase position of the individual exposures is simplified to a great extent.

It is also possible, however, to produce a predetermined groove profile such, that a single stripe system, i.e. only the base frequency, is used. For the exposure, again an interference stripe system of coherent light bundles or a pattern prepared in form of an amplitude grid can be used. If now during the exposure this pattern is continuously displaced, however, with unequal speed, the effect of the light at the points of greater displacing speed remains lower, than at the points of lower displacing speed, since the product is exposure intensity times time. In this manner it is likewise possible to produce approximately a predetermined groove profile. It is of course also possible to provide a timely variation of the intensity of the stripe system for influencing the groove profile instead of or in combination with the unequal movement.

The approximation of the desired profile is obtained so much better, the narrower the light stripes of the stripe system to be exposed. On the other hand, by a narrower width of the light stripes the exposure process is extended and also the sensitivity is increased in comparison with non-controlled variations of the displacement speed. One makes a compromise as to the width of the light stripes, so that a sufficient approximation to the groove profile is possible, whereby, however, as to the movement run no great technical requirements are placed. The relation of a predetermined width of the light stripes is of course possible only by an exposure through a pattern.

With this and other objects in view, which will become apparent in the following detailed description, the present invention will be clearly understood in connection with the accompanying drawings, in which:

FIG. 7 is a section of an arrangement for producing the grid;

FIGS. 8 and 9 are diagrammatic showings of the curves depending upon the displacement speed and light intensity, respectively;

FIG. 10 is an arrangement for the production of interfering parallel coherent light bundles;

Figures 1, 2:
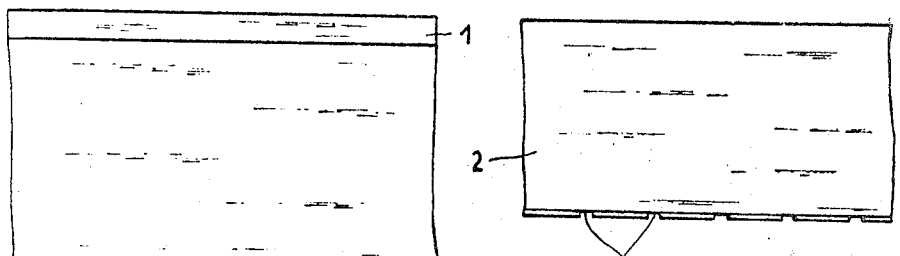
FIG. 1 is a top plan view of the diffraction grid.
FIG. 2 is an elevation thereof.
Figure 3:
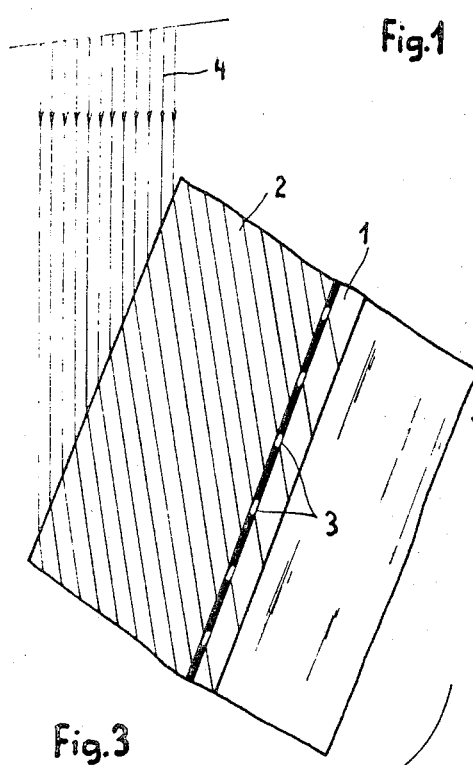
FIGS. 3 and 4 are perspective views of the diffraction grid.
Figure 4:
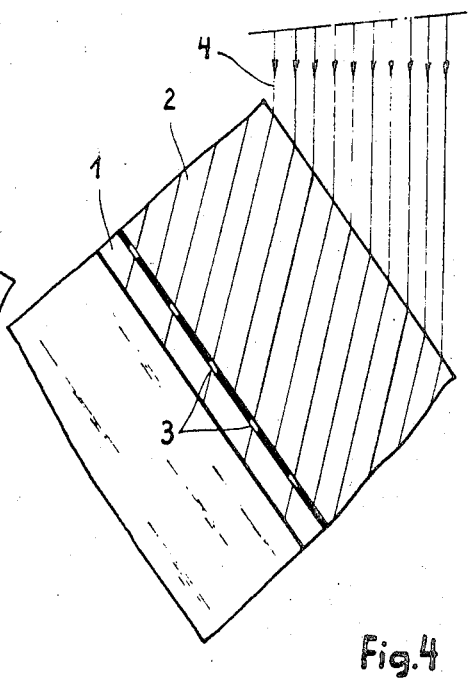
Figure 5:
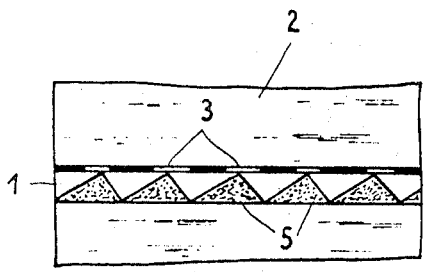
FIGS. 5 and 6 are cross-sections of the grid shown at different stages.
Figure 6:
Figure 11:
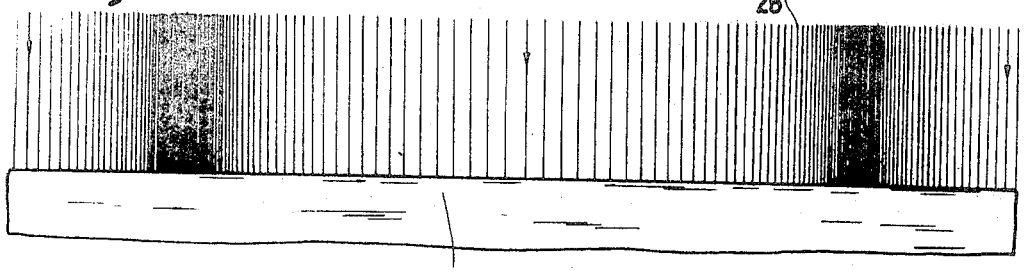
FIGS. 11, 11a, 11b and 11c are different schematic showings of the groove formation.
Figure 11A:
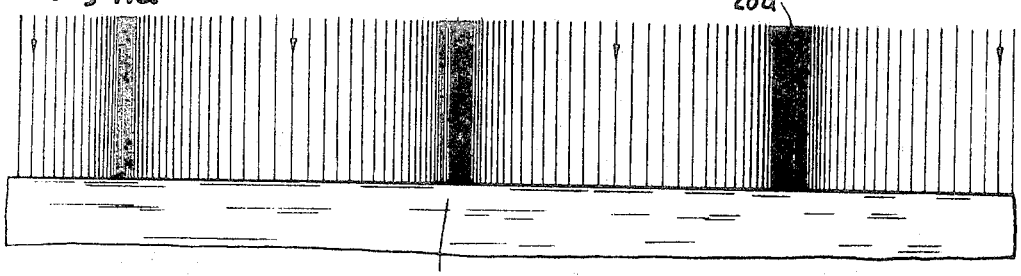
Figure 11B:
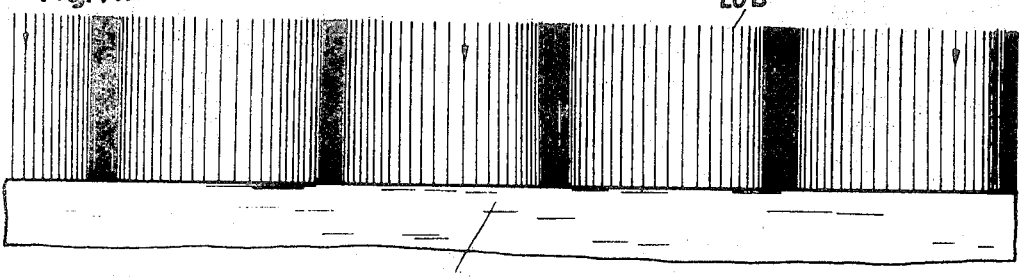
Figure 11C:
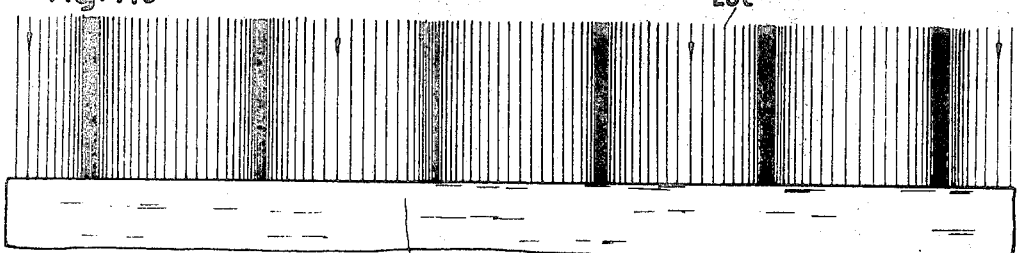

Referring now to the drawings, and in particular to FIGS. 1–6, a possibility of influencing the groove profile is disclosed. A light-sensitive layer 1 is brought into contact with a pattern 2, the grid lines 3 of which are formed as relatively narrow transparent recesses in a non-transparent base. If now the light-sensitive layer 1 is exposed through the pattern 2 by means of a parallel light bundle 4, the exposure takes place in stripe-shaped ranges, which are impinged by the light bundles passing through the recesses 3. One can now rotate during the exposure the pattern 2 and the layer 1 jointly about an axis parallel to the grid lines of the pattern (FIG. 3 starting position, FIG. 4 end position). The light rays passing the recesses 3 of the pattern 2 cover a volume range within the light-sensitive layer 1, which constitutes in cross-section a row of triangles 5, the apex of which is disposed in the transparent grid lines of the pattern (FIG. 5). Two limit sides of the triangle profile are formed from the starting position and lead position of the rays during the rotation. It is to be observed during the rotation, that it is limited to an angular range, such that the exposures of the layer through two adjacent recesses of the pattern do not cross each other. The base line of the triangles constitutes the limit line of the light-sensitive layer against the carrier base. Since the volume of the layer 1, defined by the triangular sides, is impinged by the light rays during the rotation, it obtains in this manner the desired variation by example, a light hardening. After development, the desired triangular profile remains (FIG. 6).

Referring now again to the drawings, and in particular to FIGS. 7–9, a light-sensitive layer 11 is disposed below a pattern which comprises a carrier 12 and small slits 13 of a layer opaque for the rest. The pattern 12, 13 is as closely as possible to the light-sensitive layer 11, however such that a relative movement of the pattern 12, 13 to the layer 11 in direction of the arrow V is possible. Such movement at a small distance of the opposite faces can be obtained, by example, in known manner by a thin pillow of compressed air between the faces. The pattern 12, 13 is furthermore connected with a drive means, with the help of which very sensitive small movements can be performed. Such drives are for instance in form of piezoelectric or magneto-striction drives. While now a light bundle impinges upon the light-sensitive layer through the slits 13 of the pattern, the pattern 12, 13 is displaced in the direction of the arrow V. During this displacement it can be obtained by variation of the displacement speed V (FIG. 8) or by variation of the intensity I of the incoming bundle (FIG. 9) that the product of light intensity times time varies. By suitable selection of the curves of the FIGS. 8 and 9 nearly any profile form can be obtained by exposure and development of the light-sensitive layer 11.

FIG. 10 discloses a possible embodiment of an arrangement of interferences of parallel coherent light bundles. A light bundle emerging from a laser 20 moves through a collective lens 21, a diaphragm 22 and a further collective lens 23. The laser bundle is widened in this manner. It is partly reflected on a partly transparent mirror 24, partly it penetrates this mirror 24 and impinges on a further mirror 25. The two part bundles 26 and 27 penetrate into each other and produce an interference stripe system 28 $sin^2$-shaped intensity distribution. The relative distance of the stripes depends, in addition to the laser light, from the penetration angle of the bundles 26 and 27. The penetration angle can easily be changed by variation of the position of the mirrors 24 and 25. At the place of the interference stripe system 28, a carrier 30 with a light-sensitive layer 29 can be created.

Figure 12:
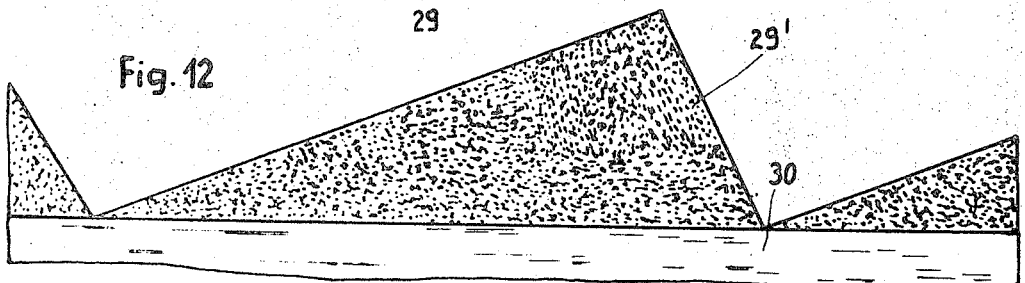
FIG. 12 is in a large scale of a triangular section forming grooves.

By variation of the penetration angle of the bundles 26 and 27, stripe systems as shown in FIGS. 11, 11a, 11b and 11c are produced successively and fixed to one and the same light-sensitive layer 29. The superposition of all these exposures causes upon development of the layer 29 a profile, which is about equal to the profile of the layer $29^1$ of FIG. 12.

While I have disclosed several embodiments of the present invention, it is to be understood that these embodiments are given by example only and not in a limiting sense.

We claim:

1. A method of producing an optical diffraction grating having a predetermined asymmetric groove profile, comprising the steps of exposing a light sensitive layer to at least one system of fringes of light, positioning the light sensitive layer relative to the fringe system in such a manner that the locally resulting exposure is an asymmetric function with respect to a normal to the surface of said light sensitive layer, subsequently developing said light sensitive layer, said step of positioning said light sensitive layer comprising bringing said light sensitive layer in contact with a grid pattern having lines and substantially against said light sensitive layer, and simultaneously moving and rotating during said exposing step said grid pattern and said light sensitive layer jointly about an axis parallel to said lines of said grid pattern relative to one another in parallel disposition with a varying displacement speed.

2. The method as set forth in claim 1, wherein said fringe system is formed by generating a series of fringe systems the space frequencies of which have ratios of whole numbers to one another, and maintaining an amount of exposure and a lateral position for each series of said fringe systems according to amplitude and phase of the corresponding Fourier analysis of the desired groove profile to be produced.

3. The method as set forth in claim 1, including the step of interferentially combining two coherent bundles of laser light for generating said fringe system of light.

4. The method, as set forth in claim 1, further comprising the step of supplying a thin pillow of compressed air between said grid pattern and said light-sensitive layer.

5. The method, as set forth in claim 1, wherein said exposing and positioning comprises, reflecting parallel coherent light beams onto said light-sensitive layer at two different penetration angles converging toward each other in a direction toward said light-sensitive layer and producing an interference stripe system, and selectively varying said penetration angles.

References Cited

UNITED STATES PATENTS

| | | | |
|---|---|---|---|
| 3,388,735 | 6/1968 | Sayce | 350—162 |
| 3,484,154 | 12/1969 | Swing et al. | 350—162 |
| 3,045,531 | 7/1962 | Prescott | 350—162 |

OTHER REFERENCES

Encyclopedia of Physics, edited by S. Flugge, vol. XXIX, Optical Instruments, Springer-Verlog, Berlin, Heidelberg, New York, 1967, section "Diffraction Gratings" by George W. Stroke.

WILLIAM D. MARTIN, Primary Examiner

W. R. TRENOR, Assistant Examiner

U.S. Cl. X.R.

96—27, 38.3, 115; 156—8; 350—162; 204—159.11